US012750088B2

(12) United States Patent
Li et al.

(10) Patent No.: US 12,750,088 B2
(45) Date of Patent: Sep. 29, 2026

(54) LEAKY COAXIAL CABLE AND COMMUNICATION SYSTEM

(71) Applicant: HUAWEI TECHNOLOGIES CO., LTD., Guangdong (CN)

(72) Inventors: Xu Li, Shenzhen (CN); Peihao Chen, Shenzhen (CN); Yibo Lv, Dongguan (CN); Rui Ni, Shenzhen (CN); Ganghua Yang, Shanghai (CN); Juntao Wu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 185 days.

(21) Appl. No.: 18/675,134

(22) Filed: May 27, 2024

(65) Prior Publication Data

US 2024/0313824 A1 Sep. 19, 2024

Related U.S. Application Data

(63) Continuation of application No. PCT/CN2022/127862, filed on Oct. 27, 2022.

(30) Foreign Application Priority Data

Nov. 25, 2021 (CN) ......................... 202111414724.7

(51) Int. Cl.
*H04B 3/02* (2006.01)
*H01Q 13/20* (2006.01)

(52) U.S. Cl.
CPC ............. *H04B 3/02* (2013.01); *H01Q 13/203* (2013.01)

(58) Field of Classification Search
CPC .......... H04B 3/02; H01Q 13/203; H01Q 1/06; H01B 11/18; H01B 11/1895; H01B 1/02
(Continued)

(56) References Cited

U.S. PATENT DOCUMENTS 4,325,039 A 4/1982 Allebone
5,467,066 A * 11/1995 Schulze-Buxloh .......................... H01Q 13/203 333/237

(Continued)

FOREIGN PATENT DOCUMENTS

CN 1332460 A 1/2002
CN 103383447 A 11/2013

(Continued)

OTHER PUBLICATIONS

Wang Lijuan:"Design and Implementation of Broadband Leaky Coaxial Cable." Dec. 2015, total 83 pages.

(Continued)

*Primary Examiner* — Angel R Estrada

(57) ABSTRACT

Embodiments of this application provide a leaky coaxial cable and a communication system. The leaky cable includes: an inner conductor, an insulation layer, and an outer conductor, where the insulation layer is configured to separate the inner conductor from the outer conductor; and the outer conductor includes M perforated segments and N non-perforated segments, the M perforated segments and the N non-perforated segments are alternately arranged, at least one of the M perforated segments includes at least three leak holes, spacings between leak holes in each of the at least one perforated segment are the same, and M and N are positive integers greater than or equal to 1.

11 Claims, 3 Drawing Sheets

(58) Field of Classification Search
USPC ......... 174/68.1, 260, 261, 102 R, 102 SP, 36
See application file for complete search history.

(56) References Cited

U.S. PATENT DOCUMENTS

| | | | | |
|---|---|---|---|---|
| 6,246,005 | B1 * | 6/2001 | Mahlandt | H01Q 13/203 174/102 R |
| 6,292,072 | B1 * | 9/2001 | Bode | H01Q 13/203 333/237 |
| 9,214,260 | B2 * | 12/2015 | Ishikawa | H01B 11/1895 |
| 9,388,975 | B2 * | 7/2016 | Wenger | H01Q 13/203 |
| 9,431,716 | B2 * | 8/2016 | Asplund | H01P 3/06 |
| 10,326,496 | B2 * | 6/2019 | Tsukamoto | H04B 1/0483 |
| 11,355,856 | B2 * | 6/2022 | Yang | H01Q 13/203 |
| 12,224,492 | B2 * | 2/2025 | Song | H01Q 1/42 |
| 2018/0351603 | A1 | 12/2018 | Nakatsukasa et al. | |

FOREIGN PATENT DOCUMENTS

| | | | |
|---|---|---|---|
| EP | 0694986 | A1 | 1/1996 |
| JP | H04113708 | A | 4/1992 |

OTHER PUBLICATIONS

Ma Yuhui:“Analysis of Bandwidth Expansion and Application of Leaky Coaxial Cable.” Jun. 2018, total 96 pages.
Wang Zhen:“Design of Wide-band Coupling Leaky Coaxial Cables.” Jan. 2012, total 62 pags.
Zeng Cong:“Research on the Wide-band Leaky Coaxial Cable for Mobile Communication.” Jun. 2018, total 78 pages.

* cited by examiner

LEAKY COAXIAL CABLE AND COMMUNICATION SYSTEM

CROSS-REFERENCE TO RELATED APPLICATIONS

This application is a continuation of International Patent Application No. PCT/CN2022/127862, filed on Oct. 27, 2022, which claims priority to Chinese Patent Application No. 202111414724.7, filed on Nov. 25, 2021. The disclosures of the aforementioned applications are hereby incorporated by reference in their entireties.

TECHNICAL FIELD

Embodiments of this application relate to the field of leaky coaxial cable technologies, and more specifically, to a leaky coaxial cable and a communication system.

BACKGROUND

A leaky coaxial cable includes an inner conductor, an insulation medium, and an outer conductor. When an electromagnetic wave is transmitted in the leaky coaxial cable, the electromagnetic wave is propagated outwards through a plurality of leak holes opened on the outer conductor.

The leaky coaxial cable can be widely used in a working environment like a coal mine, a mine, a tunnel, or a subway. The leaky coaxial cable needs to have specific coverage distances in various working environments. However, in some working environments, an input power of the leaky coaxial cable cannot be excessively high for a security purpose. As a result, the coverage distance of the leaky coaxial cable is short.

Therefore, a leaky coaxial cable that can meet a requirement like a long coverage distance without requiring an excessively high input power is urgently needed.

SUMMARY

Embodiments of this application provide a leaky coaxial cable and a communication system, to meet a requirement like a long coverage distance without requiring an excessively high input power.

According to a first aspect, a leaky coaxial cable is provided, including an inner conductor, an insulation layer, and an outer conductor, where the insulation layer is configured to separate the inner conductor from the outer conductor; and the outer conductor includes M perforated segments and N non-perforated segments, the M perforated segments and the N non-perforated segments are alternately arranged, at least one of the M perforated segments includes at least three leak holes, spacings between leak holes in each of the at least one perforated segment are the same, and M and N are positive integers greater than or equal to 1.

An arrangement manner of the perforated segments and the non-perforated segments of the outer conductor of the leaky coaxial cable and an arrangement manner of a leak hole position in the perforated segment are set. The outer conductor is divided into the M perforated segments and the N non-perforated segments, the M perforated segments and the N non-perforated segments are alternately arranged, the at least one of the M perforated segments includes the at least three leak holes, and the spacings between the leak holes in each perforated segment including the at least three leak holes are the same. In this way, a leaky coaxial cable with a long coverage distance can be manufactured in an easy-to-process manner under a condition that an input power is not high, to meet a customer requirement for low costs and easy-to-process.

With reference to the first aspect, in some implementations of the first aspect, lengths of a plurality of non-perforated segments in the N non-perforated segments are the same, and lengths of a plurality of consecutive perforated segments in the M perforated segments are in ascending order along an axial direction.

It should be understood that, that the lengths of the plurality of non-perforated segments in the N non-perforated segments are the same and that the lengths of the plurality of perforated segments in the M perforated segments are in ascending order along the axial direction may be understood as follows: $X_1<X_2<X_3$, and $Y_1=Y_2=Y_3$, or $X_1<X_2<X_3$, and $Y_2=Y_3=Y_4$, or $X_1<X_2<X_3$, and $Y_5=Y_6=Y_7$. This is not limited in embodiments of this application. Herein, X indicates a perforated segment, Y indicates a non-perforated segment, and numeric subscripts indicate numbers respectively corresponding to the perforated segment and the non-perforated segment.

It should be understood that the plurality of non-perforated segments may be some or all of the N non-perforated segments, the plurality of perforated segments may be some or all of the M perforated segments, and the plurality of non-perforated segments may be consecutive non-perforated segments, for example, $Y_1=Y_2=Y_3$ described above, or may be inconsecutive non-perforated segments, for example, $Y_1=Y_4=Y_6$. This is not limited in embodiments of this application.

The arrangement manner of the plurality of perforated segments and the arrangement manner of the leak hole position in the perforated segment are adjusted, and in this embodiment of this application, the leaky coaxial cable is used, so that a long coverage distance can be obtained when an input power is not high.

With reference to the first aspect, in some implementations of the first aspect, the plurality of non-perforated segments are consecutive non-perforated segments.

With reference to the first aspect, in some implementations of the first aspect, lengths of a plurality of perforated segments in the M perforated segments are the same, and lengths of a plurality of consecutive non-perforated segments in the N non-perforated segments are in descending order along an axial direction.

It should be understood that, that the lengths of the plurality of perforated segments in the M perforated segments are the same and that the lengths of the plurality of non-perforated segments in the N non-perforated segments are in descending order along the axial direction may be understood as follows: $X_1=X_2=X_3$, and $Y_1>Y_2>Y_3$, or $X_1=X_2=X_3$, and $Y_5>Y_6>Y_7$, or $X_1=X_2=X_3$, and $Y_2>Y_3>Y_4$, or $X_1=X_3=X_6$, and $Y_1>Y_2>Y_3$. This is not limited in embodiments of this application. Herein, X indicates a perforated segment, Y indicates a non-perforated segment, and numeric subscripts indicate numbers respectively corresponding to the perforated segment and the non-perforated segment.

It should be understood that the plurality of non-perforated segments may be some or all of the N non-perforated segments, the plurality of perforated segments may be some or all of the M perforated segments, and the plurality of perforated segments may be consecutive perforated segments, for example, $X_1=X_2=X_3$ described above, or may be inconsecutive perforated segments, $X_1=X_4=X_6$. This is not limited in embodiments of this application.

The arrangement manner of the plurality of perforated segments and the arrangement manner of the leak hole position in the perforated segment are adjusted, and in this embodiment of this application, the leaky coaxial cable is used, so that a long coverage distance can be obtained when an input power is not high.

With reference to the first aspect, in some implementations of the first aspect, the plurality of perforated segments are consecutive perforated segments.

With reference to the first aspect, in some implementations of the first aspect, lengths of a plurality of consecutive perforated segments in the M perforated segments are in ascending order along an axial direction, and lengths of a plurality of consecutive non-perforated segments in the N non-perforated segments are in descending order along the axial direction.

It should be understood that, that the lengths of the plurality of perforated segments in the M perforated segments are in ascending order along the axial direction and that the lengths of the plurality of non-perforated segments in the N non-perforated segments are in descending order along the axial direction may be understood as follows: $X_1<X_2<X_3$, and $Y_1>Y_2>Y_3$, or $X_1<X_2<X_3$, and $Y_5>Y_6>Y_7$, or $X_1<X_2<X_3$, and $Y_2>Y_3>Y_4$. This is not limited in embodiments of this application. Herein, X indicates a perforated segment, Y indicates a non-perforated segment, and numeric subscripts indicate numbers respectively corresponding to the perforated segment and the non-perforated segment.

It should be understood that the plurality of non-perforated segments may be some or all of the N non-perforated segments, the plurality of perforated segments may be some or all of the M perforated segments. This is not limited in embodiments of this application.

The arrangement manner of the plurality of perforated segments and the arrangement manner of the leak hole position in the perforated segment are adjusted, and in this embodiment of this application, the leaky coaxial cable is used, so that a long coverage distance can be obtained when an input power is not high.

With reference to the first aspect, in some implementations of the first aspect, spacings between leak holes in all of the at least one perforated segment are the same.

Spacings between holes in a perforated segment that is of the leaky coaxial cable and that includes more than three leak holes are the same. Therefore, in this embodiment of this application, a processing process can be simpler, and a template can be reused.

With reference to the first aspect, in some implementations of the first aspect, the leaky coaxial cable further includes a protective outer sheath, and the protective outer sheath is configured to protect the outer conductor.

According to a second aspect, a communication system is provided, including: a central node device and a first transceiver device, where the central node device is connected to the first transceiver device, and the first transceiver device is connected to a first port of each of at least one leaky coaxial cable.

According to the communication system, in this embodiment of this application, a signal of the first transceiver device is extended to an environment like a fully mechanized mining face of a coal mine or a coal mine way through the leaky coaxial cable, and a full coverage of the fully mechanized mining face is implemented under a transmit power constraint. This can effectively resolve a blocking problem. When the at least one leaky coaxial cable is used, a signal extension distance can be effectively increased in this embodiment of this application.

With reference to the second aspect, in some implementations of the second aspect, the communication system further includes: a first connection device, configured to connect the first transceiver device and the first port of each of the at least one leaky coaxial cable.

One end of the first connection device is connected to the transceiver device, and the other end is connected to one or more ports of the first transceiver device. In this embodiment of this application, design flexibility of the first transceiver device and the leaky coaxial cable can be improved, and a signal power can be improved by connecting a plurality of ports of the first transceiver device.

With reference to the second aspect, in some implementations of the second aspect, the communication system further includes: a second transceiver device, where the second transceiver device is connected to the central node device; and the second transceiver device is connected to a second port of each of the at least one leaky coaxial cable.

Two transceiver devices are used, the first transceiver device and the second transceiver device are respectively deployed on two sides of the central node device, and the first transceiver device and the second transceiver device are connected through the at least one leaky coaxial cable. In this way, in this embodiment of this application, coverage of the communication system can be effectively expanded. For example, the communication system is used, in this embodiment of this application, a fully mechanized mining face of a coal mine that has a longer distance can be effectively covered.

With reference to the second aspect, in some implementations of the second aspect, the communication system further includes: a second connection device, configured to connect the second transceiver device and the second port of each of the at least one leaky coaxial cable.

According to the communication system or deployment solution, in this embodiment of this application, one end of the second connection device is connected to the leaky coaxial cable, and the other end is connected to one or more ports of the second transceiver device. In this way, design flexibility of the transceiver device and design flexibility of the leaky coaxial cable are improved, and a signal power is improved when the other end is connected to a plurality of ports.

With reference to the second aspect, in some implementations of the second aspect, the communication system further includes: a second transceiver device, where the second transceiver device is connected to the central node device, and the second transceiver device is connected to the first port of each of the at least one leaky coaxial cable through the first connection device.

According to the communication system or deployment solution, in this embodiment of this application, one end of the first connection device is connected to the leaky coaxial cable, and the other end is connected to one or more ports of the first transceiver device and the second transceiver device. In this way, design flexibility of the transceiver device and design flexibility of the leaky coaxial cable are improved, and a signal power is improved when the other end is connected to a plurality of ports.

With reference to the second aspect, in some implementations of the second aspect, the first transceiver device and the second transceiver device perform signal radiation by using different frequency bands; or the first transceiver device and the second transceiver device perform signal radiation by using a same frequency band.

According to the communication system or deployment solution, in this embodiment of this application, when the first transceiver device and the second transceiver device use different frequency bands, a signal bandwidth can be greatly increased, to improve a throughput. Alternatively, in this embodiment of this application, when the first transceiver device and the second transceiver device use a same frequency band, a signal power and a signal-to-noise ratio can be improved.

With reference to the second aspect, in some implementations of the second aspect, the at least one leaky coaxial cable is the leaky coaxial cable according to any one of the first aspect or the implementations of the first aspect.

According to a third aspect, a communication system is provided, including: a central node device and a first transceiver device, where the central node device is connected to the first transceiver device, and the first transceiver device is connected to a first port of each leaky coaxial cable according to any one of the first aspect or the implementations of the first aspect.

With reference to the third aspect, in some implementations of the third aspect, the communication system further includes: a first connection device, configured to connect the first transceiver device and the first port of each leaky coaxial cable according to any one of the first aspect or the implementations of the first aspect.

With reference to the third aspect, in some implementations of the third aspect, the communication system further includes a second transceiver device, where the second transceiver device is connected to the central node device, and the second transceiver device is connected to a second port of each leaky coaxial cable according to any one of the first aspect or the implementations of the first aspect.

With reference to the third aspect, in some implementations of the third aspect, the communication system further includes: a second connection device, configured to connect the second transceiver device and a second port of each leaky coaxial cable according to any one of the first aspect or the implementations of the first aspect.

With reference to the third aspect, in some implementations of the third aspect, the communication system further includes a second transceiver device, where the second transceiver device is connected to the central node device, and the second transceiver device is connected, through the first connection device, to a first port of each leaky coaxial cable according to any one of the first aspect or the implementations of the first aspect.

With reference to the third aspect, in some implementations of the third aspect, the first transceiver device and the second transceiver device perform signal radiation by using different frequency bands; or the first transceiver device and the second transceiver device perform signal radiation by using a same frequency band.

DESCRIPTION OF EMBODIMENTS

The following describes technical solutions of embodiments in this application with reference to the accompanying drawings.

A leaky coaxial cable, also referred to as a leaky cable, includes an inner conductor, an insulation layer, and an outer conductor. When an electromagnetic wave is transmitted in the leaky coaxial cable, the electromagnetic wave is propagated outwards through a leak hole opened on the outer conductor of the leaky coaxial cable.

Figure 1:
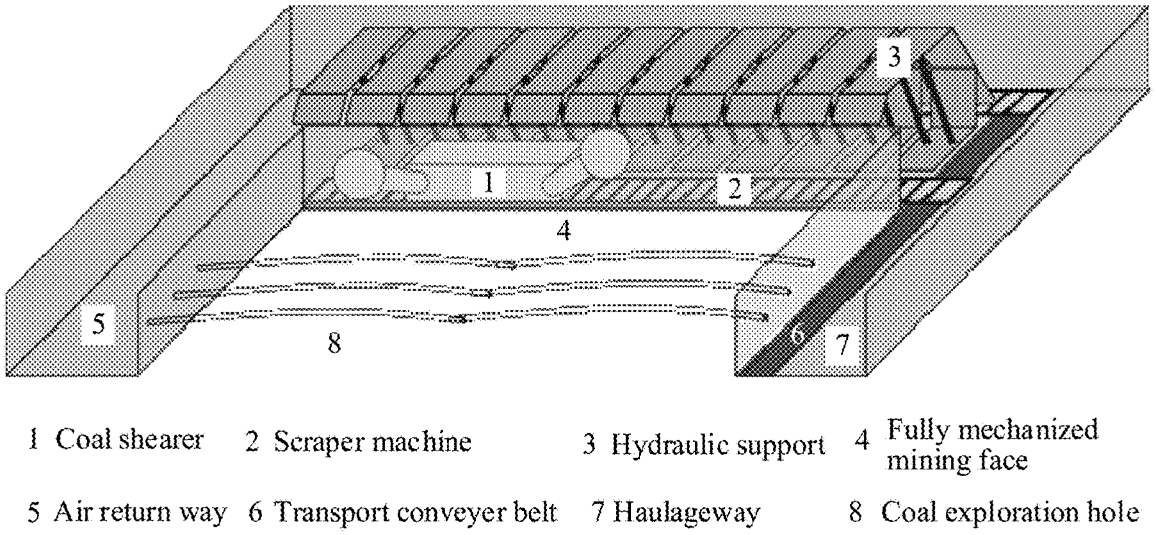
FIG. 1 is a diagram of an application scenario of a leaky coaxial cable on a fully mechanized mining face of a coal mine according to an embodiment of this application.

FIG. 1 is a diagram of an application scenario of a leaky coaxial cable on a fully mechanized mining face of a coal mine according to an embodiment of this application. For details, refer to FIG. 1. It should be understood that, in the diagram of the scenario shown in FIG. 1, a coal shearer, a hydraulic support, a scraper machine, an air return way, a transport conveyer belt, a haulageway, and a coal exploration hole are disposed inside the fully mechanized mining face of a coal mine. The coal shearer moves horizontally to cut coal. The scraper machine scrapes the coal to the transport conveyer belt. The hydraulic support plays a supporting role, to prevent collapse. With progress of coal mining, the coal shearer, the hydraulic support, and the scraper machine move forward gradually. A leaky coaxial cable is deployed inside the fully mechanized mining face of a coal mine, to improve a wireless coverage capability. The leaky coaxial cable can further be widely used in scenarios such as a subway, a tunnel, and an indoor building.

Generally, to reduce costs, in a leaky coaxial cable, a same process usually used, design of the leaky coaxial cable is not excessively optimized to improve transmission performance of an electromagnetic wave. This is because in some scenarios, an input electromagnetic wave power of the leaky coaxial cable is usually high, which can meet working requirements in most scenarios.

However, in some scenarios, for security purposes, the input electromagnetic wave power of the leaky coaxial cable needs to be not excessively high. For example, an underground environment of a coal mine is complex and filled with flammable gases such as gas. Therefore, an equivalent isotropic radiated power (EIRP) of the electromagnetic wave needs to be less than 6 W in the coal mine. Consequently, a coverage distance of the leaky coaxial cable is short.

Figure 2:
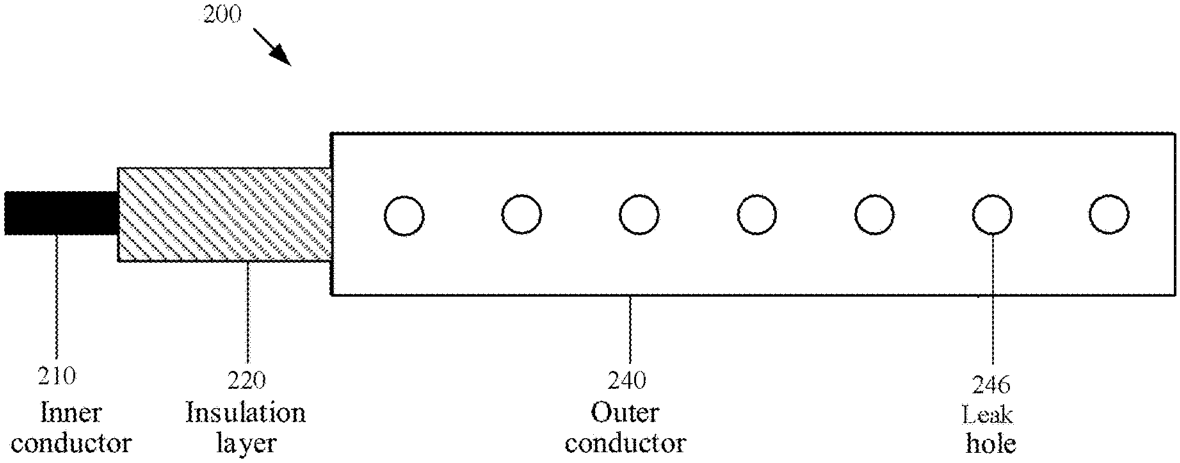
FIG. 2 is a diagram of a leaky coaxial cable.

FIG. 2 is a diagram of an existing leaky coaxial cable 200. As shown in FIG. 2, the leaky coaxial cable 200 includes an inner conductor 210, an insulation layer 220, and an outer conductor 240. The insulation layer 220 is sleeved on the inner conductor 210, the outer conductor 240 is sleeved on the insulation layer 220, a plurality of leak holes 246 are opened on the outer conductor 240, and spacings between any two leak holes 246 are the same.

It should be understood that, in a case in which a power of an electromagnetic wave radiated from a left side of the leaky cable to the surroundings is higher than a power of an electromagnetic wave radiated from a right side to the surroundings, evenly arranging a plurality of leak holes 246 causes a waste of the power of the electromagnetic wave, resulting in a limitation of a coverage distance of the leaky coaxial cable 200.

In view of the foregoing technical problem, an embodiment of this application provides a leaky coaxial cable, to meet a requirement like a long coverage distance without requiring an excessively high input power.

For ease of describing the technical solution in this embodiment of this application, a letter X indicates a perforated segment, and a letter Y indicates a non-perforated segment in this embodiment of this application.

Figure 3:
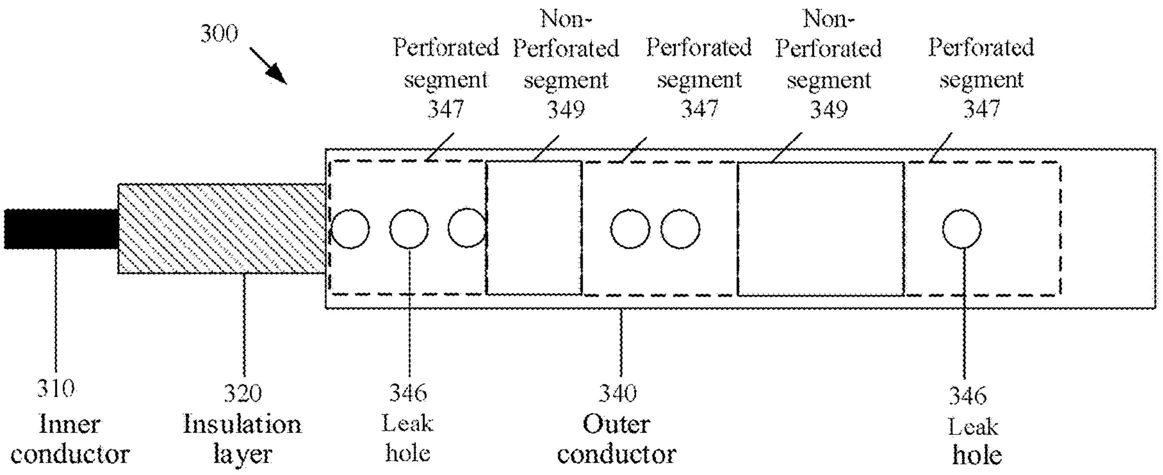
FIG. 3 is a block diagram of a structure of a leaky coaxial cable according to an embodiment of this application.

FIG. 3 is a block diagram of a structure of a leaky coaxial cable 300 according to an embodiment of this application. For details, refer to FIG. 3. The leaky coaxial cable 300 includes an inner conductor 310, an insulation layer 320, and an outer conductor 340, where the insulation layer 320 is configured to separate the inner conductor 310 from the outer conductor 340.

The insulation layer 320 is sleeved on the inner conductor 310, and the outer conductor 340 is sleeved on the insulation layer 320.

It should be understood that the outer conductor 340 includes M perforated segments 347 and N non-perforated segments 349, the M perforated segments 347 and the N non-perforated segments 349 are alternately arranged, at least one of the M perforated segments 347 includes at least three leak holes 346, each of remaining perforated segments 347 of the M perforated segments 347 includes at least one leak hole 346, spacings between leak holes 346 in each of the at least one perforated segment 347 are the same, and M and N are positive integers greater than or equal to 1.

The M perforated segments 347 and the N non-perforated segments 349 being alternately arranged may be understood as that one perforated segment 347 is matched with one non-perforated segment 349. For example, the M perforated segments 347 and the N non-perforated segments 349 being alternately arranged may be understood as that $X_1Y_1X_2Y_2X_3Y_3X_4Y_4X_5Y_5$ . . . . Numeric subscripts indicate numbers respectively corresponding to the perforated segment 347 and the non-perforated segment 349. Perforated segments 347 corresponding to different numbers may be consistent in length of a perforated segment 347, or may be inconsistent in length of a perforated segment 347. Non-perforated segments 349 corresponding to different numbers may be consistent in length of a non-perforated segment 349, or may be inconsistent in length of a non-perforated segment 349.

It should be understood that, the at least one of the M perforated segments 347 including the at least three leak holes 346 may be understood as that if there is the at least one perforated segment 347 including at least three leak holes 346 in the M perforated segments 347, each of remaining perforated segments 347 includes at least one leak hole 346, for example, one or two leak holes 346.

It should be understood that, the leaky coaxial cable 300 may arrange the perforated segment 347 at a start position of the cable, or may arrange the non-perforated segment 349 at a start position of the cable. The leaky coaxial cable 300 may arrange the perforated segment 347 at an end position of the cable, or may arrange the non-perforated segment 349 at an end position of the cable. This is not limited in embodiments of this application.

It should be noted that the leaky coaxial cable 300 in this embodiment of this application may be a part of an actual leaky coaxial cable 300, and the part may be located at a start position, an end position, or any middle position of the actual leaky coaxial cable 300.

The outer conductor 340 of the leaky coaxial cable 300 is divided into the M perforated segments 347 and the N non-perforated segments 349, the M perforated segments 347 and the N non-perforated segments 349 are alternately distributed, there is the at least one perforated segment 347 including at least three leak holes 346 in the M perforated segments 347, the remaining perforated segment 347 include one or two leak holes 346, and when a perforated segment 347 includes at least three leak holes 346, spacings between leak holes 346 in the perforated segments are consistent. In this way, an arrangement of leak holes 346 in the plurality of perforated segments 347 is adjusted, and in this embodiment of this application, the leaky coaxial cable 300 is used, so that a long coverage distance can be obtained in a scenario in which an input power is not high.

An arrangement manner of the perforated segments 347 and the non-perforated segments 349 of the outer conductor 340 of the leaky coaxial cable 300 and an arrangement manner of a leak hole position in the perforated segment are set. The outer conductor 340 is divided into a plurality of perforated segments 347 and a plurality of non-perforated segments 349, the plurality of perforated segments 347 and the plurality of non-perforated segments 349 are alternately arranged, at least one of the plurality of perforated segments 347 includes at least three leak holes 346, and spacings between leak holes 346 in each perforated segment 347 including the at least three leak holes 346 are the same. In this way, a leaky coaxial cable 300 with a long coverage distance can be manufactured in an easy-to-process manner under a condition that an input power is not high, to meet a customer requirement for low costs and easy-to-process.

Figure 4:
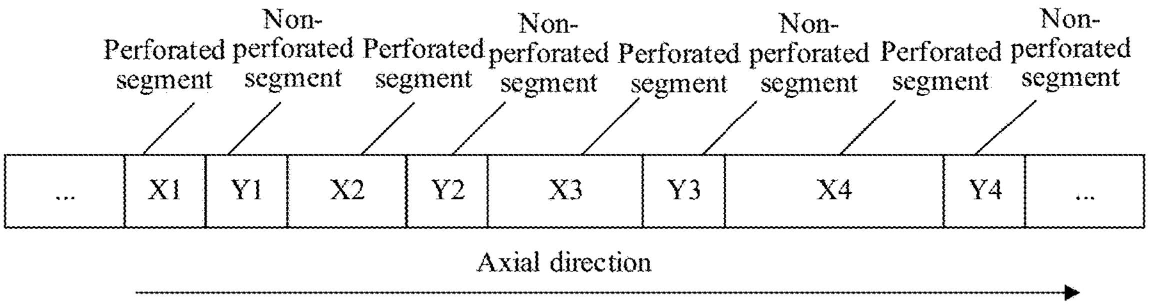
FIG. 4 is a diagram of a structure of an arrangement of perforated segments and non-perforated segments according to an embodiment of this application.
Figure 5:
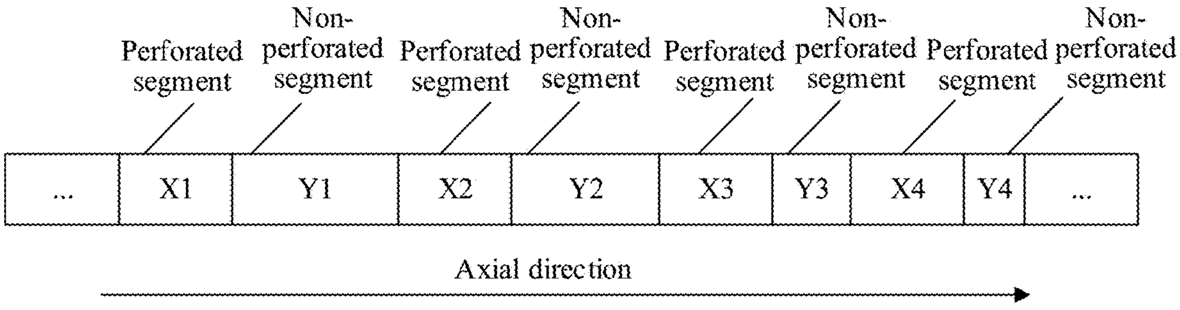
FIG. 5 is a diagram of a structure of another arrangement of perforated segments and non-perforated segments according to an embodiment of this application.
Figure 6:
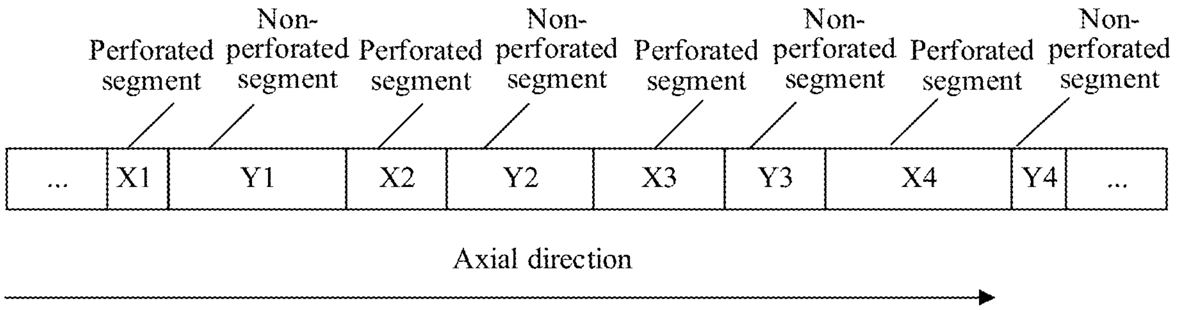
FIG. 6 is a diagram of a structure of still another arrangement of perforated segments and non-perforated segments according to an embodiment of this application.

The following further describes, with reference to FIG. 4 to FIG. 6, a structure of a leaky coaxial cable described in embodiments of this application.

FIG. 4 is a diagram of a structure of an arrangement of perforated segments and non-perforated segments according to an embodiment of this application. For details, refer to FIG. 4.

Lengths of a plurality of non-perforated segments in the N non-perforated segments of the outer conductor of the leaky coaxial cable are consistent, and lengths of a plurality of consecutive perforated segments in the M perforated segments are in ascending order along an axial direction.

The lengths of the plurality of non-perforated segments in the N non-perforated segments included by the outer conductor of the leaky coaxial cable are consistent. The lengths of the plurality of consecutive perforated segments in the M perforated segments included by the outer conductor of the leaky coaxial cable are in ascending order along the axial direction, that is, a length of each perforated segment of the plurality of consecutive perforated segments is greater than that of a preceding perforated segment. For example, $X_1<X_2<X_3<$ . . . .

It should be understood that, that the lengths of the plurality of non-perforated segments in the N non-perforated segments are the same and that the lengths of the plurality of perforated segments in the M perforated segments are in ascending order along the axial direction may be understood as follows: $X_1<X_2<X_3$, and $Y_1=Y_2=Y_3$, or $X_1<X_2<X_3$, and $Y_2=Y_3=Y_4$, or $X_1<X_2<X_3$, and $Y_5=Y_6=Y_7$. This is not limited in embodiments of this application.

It should be understood that the plurality of non-perforated segments may be some or all of the N non-perforated segments, the plurality of perforated segments may be some or all of the M perforated segments, and the plurality of non-perforated segments may be consecutive non-perforated segments, for example, $Y_1=Y_2=Y_3$ described above, or may be inconsecutive non-perforated segments, for example, $Y_1=Y_4=Y_6$. This is not limited in embodiments of this application.

The arrangement manner of the plurality of perforated segments and the arrangement manner of the leak hole position in the perforated segment are adjusted, and in this embodiment of this application, the leaky coaxial cable is used, so that a long coverage distance can be obtained in a scenario in which an input power is not high.

FIG. 5 is a diagram of a structure of another arrangement of perforated segments and non-perforated segments according to an embodiment of this application. For details, refer to FIG. 5.

Lengths of a plurality of perforated segments in the M perforated segments of the outer conductor of the leaky coaxial cable are consistent, and lengths of a plurality of consecutive non-perforated segments in the N non-perforated segments are in descending order along an axial direction.

The lengths of the plurality of perforated segments in the M perforated segments included by the outer conductor of the leaky coaxial cable are consistent. The lengths of the plurality of non-perforated segments in the N non-perforated segments included by the outer conductor of the leaky coaxial cable are in descending order along the axial direction, that is, a length of each non-perforated segment of the plurality of consecutive non-perforated segments in the N non-perforated segments is smaller than that of a preceding non-perforated segment. For example, $Y_1>Y_2>Y_3> \ldots$.

It should be understood that, that the lengths of the plurality of perforated segments in the M perforated segments are the same and that the lengths of the plurality of non-perforated segments in the N non-perforated segments are in descending order along the axial direction may be understood as follows: $X_1=X_2=X_3$, and $Y_1>Y_2>Y_3$, or $X_1=X_2=X_3$, and $Y_5>Y_6>Y_7$, or $X_1=X_2=X_3$, and $Y_2>Y_3>Y_4$. This is not limited in embodiments of this application.

It should be understood that the plurality of non-perforated segments may be some or all of the N non-perforated segments, the plurality of perforated segments may be some or all of the M perforated segments, and the plurality of perforated segments may be consecutive perforated segments, for example, $X_1=X_2=X_3$ described above, or may be inconsecutive perforated segments, $X_1=X_4=X_6$. This is not limited in embodiments of this application.

The arrangement manner of the plurality of perforated segments and the arrangement manner of the leak hole position in the perforated segment are adjusted, and in this embodiment of this application, the leaky coaxial cable is used, so that a long coverage distance can be obtained in a scenario in which an input power is not high.

FIG. 6 is a diagram of a structure of still another arrangement of perforated segments and non-perforated segments according to an embodiment of this application. For details, refer to FIG. 6. Lengths of a plurality of consecutive perforated segments in the M perforated segments of the outer conductor of the leaky coaxial cable are in ascending order along an axial direction, and lengths of a plurality of consecutive non-perforated segments in the N non-perforated segments are in descending order along the axial direction.

The lengths of the plurality of perforated segments included by the outer conductor of the leaky coaxial cable are in ascending order along the axial direction, and the lengths of the plurality of non-perforated segments are in descending order along the axial direction, that is, $X_1<X_2<X_3< \ldots, Y_1>Y_2>Y_3> \ldots$.

It should be understood that, that the lengths of the plurality of consecutive perforated segments in the M perforated segments are in ascending order along the axial direction and that the lengths of the plurality of consecutive non-perforated segments in the N non-perforated segments are in descending order along the axial direction may be understood as follows: $X_1<X_2<X_3$, and $Y_1>Y_2>Y_3$, or $X_1<X_2<X_3$, and $Y_5>Y_6>Y_7$, or $X_1<X_2<X_3$, and $Y_2>Y_3>Y_4$. This is not limited in embodiments of this application.

It should be understood that the plurality of non-perforated segments may be some or all of the N non-perforated segments, the plurality of perforated segments may be some or all of the M perforated segments. This is not limited in embodiments of this application.

The arrangement manner of the plurality of perforated segments and the arrangement manner of the leak hole position in the perforated segment are adjusted, and in this embodiment of this application, the leaky coaxial cable is used, so that a long coverage distance can be obtained in a scenario in which an input power is not high.

In an implementation, spacings between leak holes in all of the at least one perforated segment are the same.

When there is the at least one perforated segment in the leaky coaxial cable including at least three leak holes, the spacings between the leak holes in all of the at least one perforated segment are the same.

In an implementation, the leaky coaxial cable further includes a protective outer sheath, and the protective outer sheath is configured to protect the outer conductor.

In an implementation, when lengths of a plurality of perforated segments are the same, quantities of leak holes included in all of the plurality of perforated segments are the same. In this way, embodiments of this application can further implement simplicity and convenience of a processing process.

Figure 7:
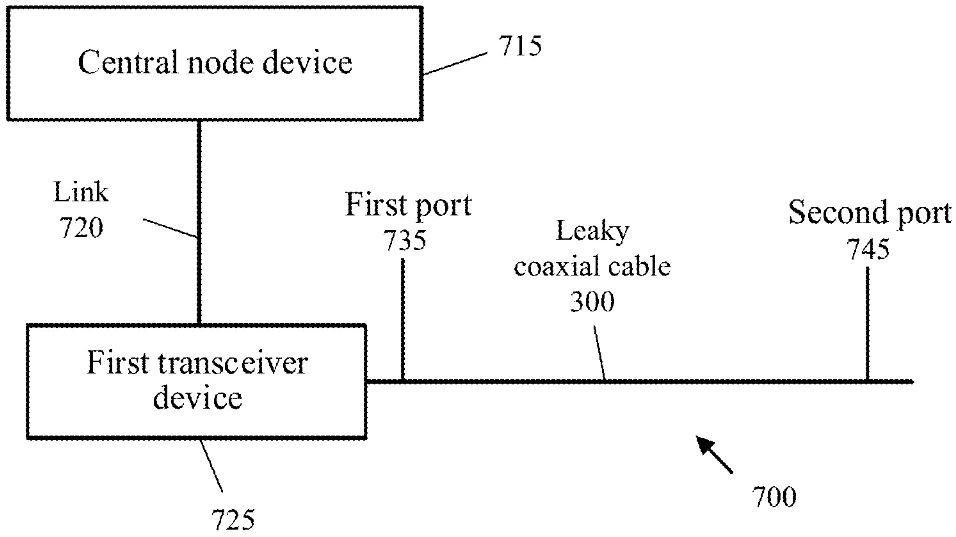
FIG. 7 is a diagram of an architecture of a communication system according to an embodiment of this application.

The following describes, with reference to FIG. 7, a communication system based on a leaky coaxial cable according to an embodiment of this application.

It should be understood that, in this embodiment of this application, the communication system based on the leaky coaxial cable can be deployed in a scenario like a fully mechanized mining face of a coal mine. In addition, the leaky coaxial cable used in the communication system may be any one of the foregoing leaky coaxial cables, or may be an existing leaky coaxial cable.

FIG. 7 is a diagram of an architecture of a communication system according to an embodiment of this application. For details, refer to FIG. 7. The communication system includes:

a central node device and a first transceiver device, where the central node device is connected to the first transceiver device, and the first transceiver device is connected to a first port of each of at least one leaky coaxial cable 300.

It should be understood that the first port of each leaky coaxial cable 300 means one end of each leaky coaxial cable 300. When the first transceiver device is connected to the first port of each of the at least one leaky coaxial cable 300, a second port of each leaky coaxial cable 300 may be suspended, or may be connected to another device, for example, a matching load or antenna.

The central node device is connected to the first transceiver device through a link. The link may be a fiber-based common public radio interface (CPRI)/enhanced CPRI (eCPRI)/radio over fiber (ROF), or may be an electrical connection line, or may be a hybrid connection of a fiber-based connection and an electrical connection line.

In descriptions of an example, the central node device is a baseband unit (BBU), a remote radio unit hub (RHUB), or another device. The first transceiver device is a pico remote radio unit (pRRU), and may be a Wi-Fi wireless access point, or may be another device.

It should be understood that the first transceiver device is connected to the first port of each of the at least one leaky coaxial cable 300, and the second port of each of the at least one leaky coaxial cable 300 may be suspended or connected to another device, for example, a matching load or antenna. This is not limited in embodiments of this application.

According to the communication system, in this embodiment of this application, a signal of the first transceiver device is extended to an environment like a fully mechanized mining face of a coal mine or a coal mine way through the leaky coaxial cable 300, and a full coverage of the fully mechanized mining face is implemented under a transmit power constraint. This can effectively resolve a blocking problem. When the at least one leaky coaxial cable 300 is used, a signal extension distance can be effectively increased in this embodiment of this application.

The following further describes a working process of the communication system shown in FIG. 7.

In an uplink transmission process, a transmit signal of a terminal device reaches the leaky coaxial cable through a radio link and is transmitted to two sides of the leaky coaxial cable, and an entrance of the first transceiver device is reached. The first transceiver device collects this signal and transmits the signal to the central node device, and the central node device processes the signal from the first transceiver device, to form a single cell.

In a downlink transmission process, a signal sent by a network end is transmitted to the first transceiver device through the central node device and is transmitted outwards through a plurality of leaky coaxial cables connected to the first transceiver device, and the terminal device is reached through the radio link.

In an implementation, the communication system further includes a first connection device, where the first connection device is configured to connect the first transceiver device and the first port of each of the at least one leaky coaxial cable. In this way, in this embodiment of this application, an output power of the first transceiver device can be improved.

One end of the first connection device is connected to the transceiver device, and the other end is connected to one or more ports of the first transceiver device. In this embodiment of this application, design flexibility of the first transceiver device and the leaky coaxial cable can be improved, and a signal power can be improved by connecting a plurality of ports of the first transceiver device.

In an implementation, the communication system further includes a second transceiver device, where the second device is connected to the second port of each of the at least one leaky coaxial cable.

The first transceiver device and the second transceiver device in the communication system are connected through the at least one leaky coaxial cable.

Optionally, the first transceiver device is connected to the first port of each of the at least one leaky coaxial cable through the first connection device, and the second transceiver device is directly connected to the second port of each of the at least one leaky coaxial cable.

Two transceiver devices are used, the first transceiver device and the second transceiver device are respectively deployed on two sides of the central node device, and the first transceiver device and the second transceiver device are connected through the at least one leaky coaxial cable. In this way, in this embodiment of this application, coverage of the communication system can be effectively expanded.

In an application scenario of the fully mechanized mining face of a coal mine, the communication system is used, in this embodiment of this application, a fully mechanized mining face of a coal mine that has a longer distance can be effectively covered. For example, if a transceiver device on one side covers 200 m, and a transceiver device on the other side covers 200 m, the fully mechanized mining face of a coal mine that has a length of 400 m can be covered in total.

In an implementation, the communication system further includes a second connection device, where the second connection device is configured to connect the second transceiver device and the second port of each of the at least one leaky coaxial cable.

In descriptions of an example, the first transceiver device and the second transceiver device are respectively deployed on two sides of the central node device, and the central node device can separately process signals respectively transmitted by the first transceiver device and the second transceiver device, to form dual cells; or the central node device may simultaneously process signals transmitted by the first transceiver device and the second transceiver device, to form a single cell.

According to the communication system or deployment solution, in this embodiment of this application, one end of the second connection device is connected to the leaky coaxial cable, and the other end is connected to one or more ports of the second transceiver device. In this way, design flexibility of the transceiver device and design flexibility of the leaky coaxial cable are improved, and a signal power is improved when the other end is connected to a plurality of ports.

In an implementation, the first transceiver device and the second transceiver device perform signal radiation by using different frequency bands; or the first transceiver device and the second transceiver device perform signal radiation by using a same frequency band.

It should be understood that, when the first transceiver device and the second transceiver device perform signal radiation by using a same frequency band, that is, when two cells (a left cell indicates a first cell, and a right cell indicates a second cell) share one frequency band, places that are in the left and right cells and that are respectively close to the first transceiver device and the second transceiver device are defined as a first central cell and a second central cell, and places that are respectively away from the first transceiver device and the second transceiver device are defined as a first edge cell and a second edge cell.

It should be understood that, when two cells (a left cell indicates a first cell, and a right cell indicates a second cell) share one frequency band, places that are in the left and right cells and that are respectively close to the first transceiver device and the second transceiver device are defined as a first central cell and a second central cell, and places that are respectively away from the first transceiver device and the second transceiver device are defined as a first edge cell and a second edge cell.

It should be understood that, when two cells can share a spectrum simultaneously, the first central cell uses a frequency band W1C, and the first edge cell uses a frequency band W1B; and the second cell uses a frequency band W2C, and the second edge cell uses a frequency band W2B. In this case, the four meet the following relationship: W1C+W1B=W2C+W2B, where an intersection of W1B and W2B is an empty set, that is, the two cells do not interfere with each other. In other words, W1B belongs to a subset of W2C, and W2B belongs to a subset of W1C. For example, W1C=[3.45 GHz, 3.49 GHz], W1B=[3.49 G, 3.5 GHz], W2C=[3.48 G, 3.5 GHz], and W2B=[3.45 G, 3.48 GHz].

It should be understood that when the dual cells are formed between the first transceiver device and the second transceiver device, the two cells may share a frequency band, or may not share a frequency band. When the two cells share a frequency band, the preceding relationship needs to be met.

According to the communication system or deployment solution, in this embodiment of this application, when the first transceiver device and the second transceiver device use different frequency bands, a signal bandwidth can be greatly increased, to improve a throughput. Alternatively, in this embodiment of this application, when the first transceiver device and the second transceiver device use a same frequency band, a signal power and a signal-to-noise ratio can be improved.

In an implementation, the communication system further includes a second transceiver device, where the second transceiver device is connected to the central node device, and the second transceiver device is connected to the first port of each of the at least one leaky coaxial cable through the first connection device.

The first transceiver device and the second transceiver device are connected to the first port of each of the at least one leaky coaxial cable through the first connection device. The first port of each of the at least one leaky coaxial cable is connected to the first connection device, the first connection device is further connected to the first transceiver device and the second transceiver device, and the second port of each leaky coaxial cable is suspended or connected to another device, for example, a matching load or antenna.

According to the communication system or deployment solution, in this embodiment of this application, one end of the first connection device is connected to the leaky coaxial cable, and the other end is connected to one or more ports of the first transceiver device and the second transceiver device. In this way, design flexibility of the transceiver device and design flexibility of the leaky coaxial cable are improved, and a signal power is improved when the other end is connected to a plurality of ports.

It should be noted that, in this embodiment of this application, the communication system may further include a plurality of transceiver devices.

It should be understood that the first connection device and the second connection device each may be a combiner, a coaxial cable, or a conversion adapter, or may be another device. When the first connection device and the second connection device each are a combiner, a plurality of interfaces of the transceiver device in this embodiment of this application may be reused, to increase a signal power.

It should be noted that, in this embodiment of this application, a quantity of leaky coaxial cables connected to the first transceiver device is not limited, which may be one or more. When the communication system includes the first transceiver device and the second transceiver device, and the first transceiver device and the second transceiver device are connected through the leaky coaxial cable, the quantity of leaky coaxial cables may be one or more. This is not limited in embodiments of this application.

It should be noted that, in this embodiment of this application, the leaky coaxial cable used in the communication system may be a conventional leaky coaxial cable, or may be the leaky coaxial cable described in this embodiment of this application. This is not limited in embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiments are merely examples. For example, division into the units is merely logical functional division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

The foregoing descriptions are merely implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A leaky coaxial cable, comprising:

an inner conductor;

an insulation layer; and an outer conductor;

the insulation layer separating the inner conductor from the outer conductor; and the outer conductor comprising M perforated segments alternating with N non-perforated segments, lengths of the M perforated segments are in ascending order along an axial direction, lengths of the N non-perforated segments are in descending order along the axial direction, at least one perforated segment of the M perforated segments comprises at least three leak holes, and M and N are positive integers greater than or equal to 1.

2. The leaky coaxial cable according to claim 1, wherein spacings between leak holes in a perforated segment of the at least one perforated segment are the same.

3. The leaky coaxial cable according to claim 1, wherein the leaky coaxial cable further comprises a protective outer sheath, and the protective outer sheath is configured to protect the outer conductor.

4. The leaky coaxial cable according to claim 1, wherein spacings between leak holes in a perforated segment of the at least one perforated segment are the same.

5. The leaky coaxial cable according to claim 1, wherein the leaky coaxial cable further comprises a protective outer sheath, and the protective outer sheath is configured to protect the outer conductor.

6. A communication system, comprising:

a central node device; and a first transceiver device;

the central node device is connected to the first transceiver device, and the first transceiver device is connected to a first port of each of at least one leaky coaxial cable, the at least one leaky coaxial cable comprising:

an inner conductor;

an insulation layer; and an outer conductor;

the insulation layer separating the inner conductor from the outer conductor; and the outer conductor comprising M perforated segments alternating with N non-perforated segments, lengths of the M perforated segments are in ascending order along an axial direction, lengths of the N non-perforated segments are in descending order along the axial direction, at least one perforated segment of the M perforated segments comprises at least three leak holes, and M and N are positive integers greater than or equal to 1.

7. The communication system according to claim 6, wherein the communication system further comprises:

a first connection device, configured to connect the first transceiver device and a first port of each leaky coaxial cable of the at least one leaky coaxial cable.

8. The communication system according to claim 6, wherein the communication system further comprises:

a second transceiver device, wherein the second transceiver device is connected to the central node device; and the second transceiver device is connected to a second port of each leaky coaxial cable of the at least one leaky coaxial cable.

9. The communication system according to claim 8, wherein the communication system further comprises:

a second connection device, configured to connect the second transceiver device and the second port of each of the at least one leaky coaxial cable.

10. The communication system according to claim 7, wherein the communication system further comprises:

a second transceiver device, wherein the second transceiver device is connected to the central node device, and the second transceiver device is connected to the first port of each leaky coaxial cable of the at least one leaky coaxial cable through the first connection device.

11. The communication system according to claim 8, wherein the first transceiver device and the second transceiver device perform signal radiation by using different frequency bands; or the first transceiver device and the second transceiver device perform signal radiation by using a same frequency band.

* * * * *